Aug. 7, 1923.
G. H. WRIGHT
1,464,464
SEED DISPENSING MECHANISM FOR PLANTERS
Filed June 14, 1921
2 Sheets—Sheet 1
Fig. 1,
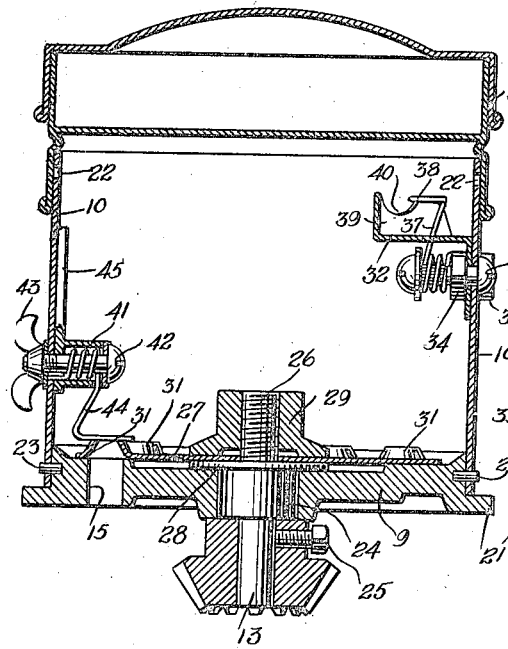
Fig. 2,
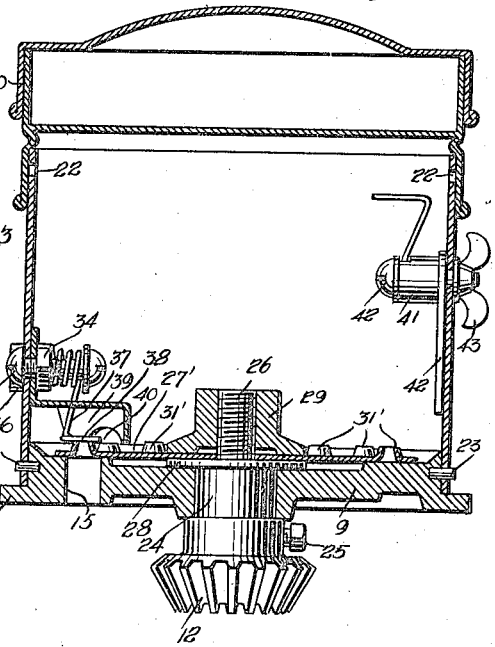
Fig. 3,
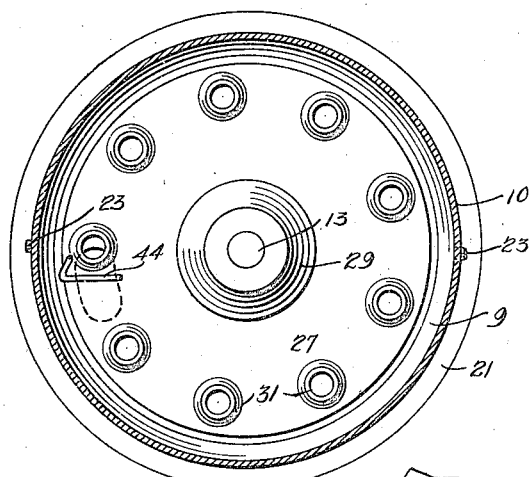
Fig. 4,
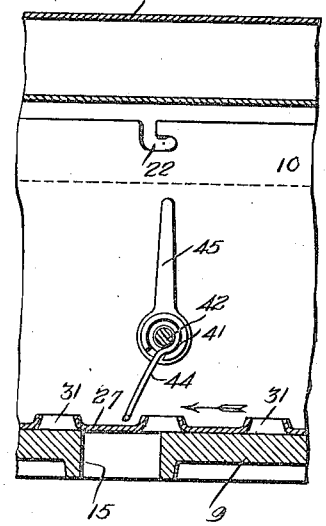
Fig. 5,
WITNESSES
Edw. Thorpe
F. J. Foster
INVENTOR
George H. Wright
BY
Munn & Co.
ATTORNEYS

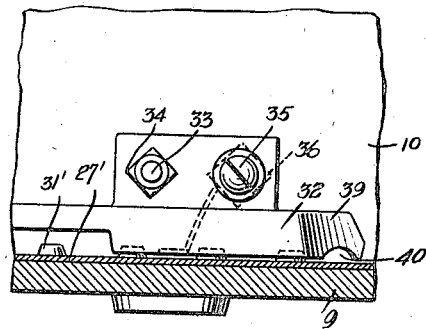
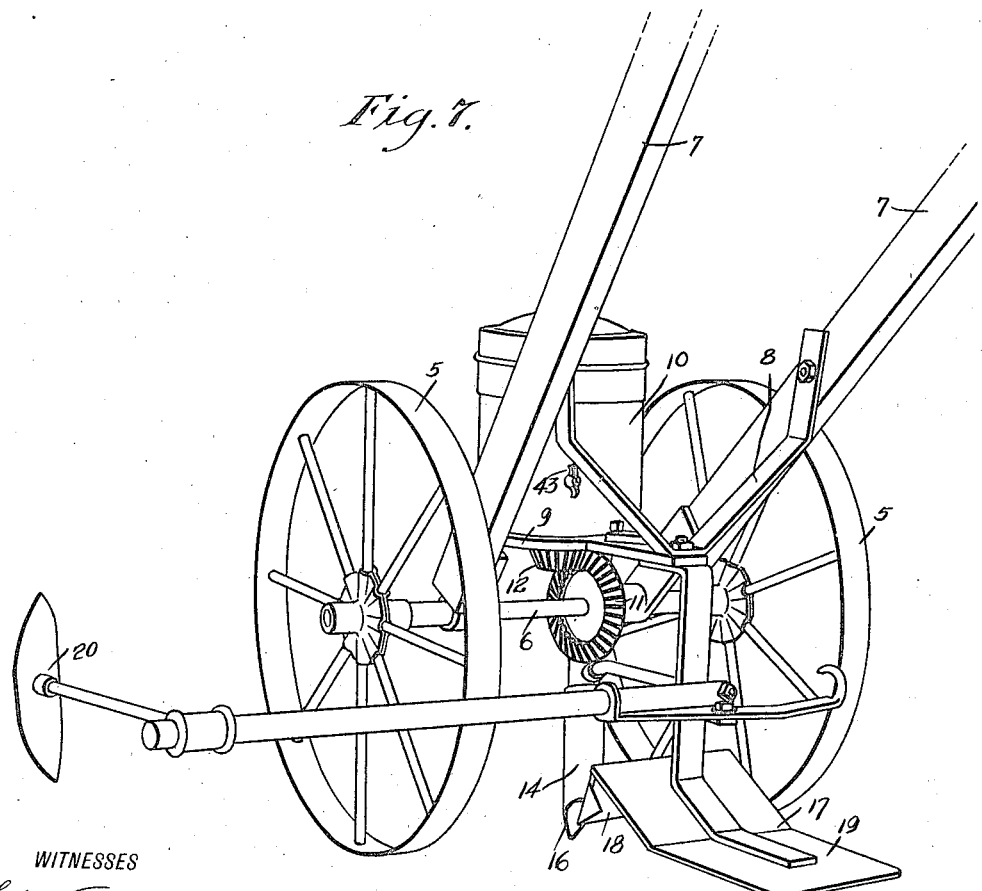

Patented Aug. 7, 1923.

1,464,464

UNITED STATES PATENT OFFICE.

GEORGE H. WRIGHT, OF SPOKANE, WASHINGTON.

SEED-DISPENSING MECHANISM FOR PLANTERS.

Application filed June 14, 1921. Serial No. 477,563.

*To all whom it may concern:*

Be it known that I, GEORGE H. WRIGHT, a citizen of the United States, and a resident of Spokane, in the county of Spokane and State of Washington, have invented a new and Improved Seed-Dispensing Mechanism for Planters, of which the following is a full, clear, and exact description.

This invention relates to improvements in seed dispensing mechanisms for planters, particularly to an improved apparatus of the general character described in my application for Patent Serial No. 371,968, filed April 7th, 1920, and allowed March 11th, 1921.

An object of this invention is to provide a reversible seed hopper, which may be utilized for dispensing various kinds of seeds; to provide an improved deflector in the seed hopper, and to make various other slight changes in the general construction of the hopper which tend to increase its efficiency.

A still further object is to suggest a slightly modified form of planter organization with which the dispensing mechanism may be conveniently used.

With these and other objects in view, the invention consists in certain novel features of construction and combinations and arrangements of parts as will be more fully hereinafter described and pointed out in the claims.

In the accompanying drawings:—

Figure 1 is a view in longitudinal section through my improved seed hopper dispensing mechanism;

Figure 2 is a similar view with the hopper reversed;

Figure 3 is a view in transverse section through the hopper;

Figure 4 is a fragmentary detail view in longitudinal section therethrough;

Figure 5 is a fragmentary view in transverse section through the hopper;

Figure 6 is a fragmentary detail view through the floor of the hopper, illustrating the mechanism for ejecting small sized seeds; and Figure 7 is a perspective view illustrating the general planter organization with which the dispensing mechanism is used.

Referring particularly to Figure 7, it will be noted that the planter includes a pair of traction wheels 5 adapted to turn with an axle 6. Rearwardly and upwardly handle members 7 are connected to the axle 6. A depending hook 8 located between and connected to the handle bars 7 supports a frame 9, whereon the seed hopper 10 is located. A beveled gear wheel 11 fixed to turn with the axle 6 normally meshes with a beveled pinion 12 carried by a spindle 13, which is journaled in the floor of the seed box. A tubular member 14 is in direct alignment with an opening 15 in the bottom of the seed hopper through which the seeds are dropped. The lower end of this tubular member is sharpened, as indicated at 16, to provide a plow which will dig a trench for the seeds. A covering shoe 17 constructed in any approved manner includes a depending flange 18 at its forward end adapted to crowd the soil over the seeds after they have been dropped and a flat ground engaging portion 19 which smoothes the soil over the seeds. Any approved marking device such as 20, may be operatively connected to the frame 8.

It is to be understood that the foregoing description of the planter organization is merely for the purpose of illustrating one convenient form of planter with which the seed dispensing mechanism may be utilized; that I do not wish to limit myself to this form of planter organization, and that I do not claim in this application any novel features of the organization itself.

Referring now specifically to the seed hopper which is supported upon the platform 9, it will be noted that the platform comprises the floor of the seed box. The box itself is of general cylindrical form open at both ends. It fits over the platform 9 and abuts at its lower end against a base flange 21 integral with the platform. The seed box is reversible for a purpose which will hereinafter appear and is provided adjacent each end with bayonet slots 22 interlocking with studs 23 fixed to the platform.

The vertical spindle 13 is journaled in a bearing sleeve 24 in the platform 9 and the pinion 12 is fixed to turn with the spindle by tightly adjusting a set screw 25 carried by the pinion. The upper end of the spindle 13 which projects into the seed box is threaded, as shown at 26. A seed plate 27 is formed with a central opening to receive the threaded end of the spindle and a disk 28 is interposed around the spindle between the sleeve 24 and the seed plate 27. A deflector nut 29 around the inner end of the spindle 13 clamps the seed plate tightly against the disk and couples all of the parts for movement with the spindle 13 and pinion 12.

A double cover 30 is formed with a compartment which may conveniently receive extra seed plates. It will be noted that the seed plate 27′ illustrated in Figure 2 in all respects like the plate 27 shown in Figure 1, except that the seed pockets 31 in the plate 27 are larger and spaced a greater distance apart than the pockets 31′ in the plate 27′. The plate 27′ is of course intended for dispensing smaller seeds than the plate 27. In each plate, however, the pockets are formed with raised walls and are arranged in an annular series adapted to successively register with the opening 15 in the platform.

The general form of the seed ejecting mechanism used with the plate 27′ was disclosed in my prior application above referred to and includes a housing 32 secured to the inner wall of the seed box directly over the opening 15 by means of a bolt 33 and nut 34. Another bolt 35 secured in place by a nut 36 provides a place of attachment for one end of a spring finger 37 which extends through a slot in the housing and terminates in an angular sweeping member 38 having wiping contact with the seed pockets 31′. A depending extension 39 on the housing is formed with a small opening 40 therein controlling the passage of seeds into the housing and preventing the jamming of seeds in the pockets. The seeds passing through the housing are ejected from the pockets by the spring finger 37.

It has been discovered, however, that the ejecting mechanism above described is impractical for ejecting large seeds of any kind. For this reason, the seed box is made reversible and another ejecting mechanism for use with the plate 27 is fixed to the inner wall of the other end of the seed box at a point diametrically opposite the first mentioned mechanism, so that it may be brought into operative position by merely reversing the seed box.

In this ejecting mechanism, a sleeve 41 is held against the inner wall of the seed box by a bolt 42 and a wing nut 43 located on the outside of the seed box. A spring sweep 44 very similar to the finger 37 is connected at one end to the bolt 42 and extends at the other end through an opening in the sleeve 41. An integral handle lever 45 is formed on the sleeve 41 for turning the sleeve to regulate the tension on the sweep 44 and the sleeve may be locked in any desired position by the nut 43. When the seed plate 27 is rotated, the sweep 44 rides over the outer walls of the seed pockets and positively ejects the seeds from the pockets through the opening 15. This form of open spring sweep prevents jamming of the larger seeds in the pockets, whereas the use of the housing tends to crush and mutilate them, although it is very effective for use with the smaller and tougher seeds.

The operation of the apparatus will be readily understood. Either of the seed plates with its ejecting mechanism may be utilized in accordance with the class of seeds to be planted. As the planter is pushed over the ground, turning of the axle operates through the medium of the gear wheel 11 and pinion 12 to rotate the seed plate and deflector nut. The ejector mechanism operates as above described to eject one seed at a time so that the same are accurately spaced apart and the trouble of later thinning out the growing plants is eliminated. As the seeds are planted, the shoe 17 operates to cover and smooth soil over them.

The particular number and size of the holes in the seed plates may be varied in accordance with the kinds of seeds to be planted.

Various slight changes and alterations might be made in the general form and arrangement of the parts described without departing from the invention and hence I do not wish to limit myself to the precise details set forth, but shall consider myself at liberty to make such slight changes and alterations as fairly fall within the spirit and scope of the appended claims.

I claim:

1. In a seed dispensing mechanism for planters, a platform having an opening therein, a revolving seed plate on said platform having seed pockets therein extending entirely therethrough and successively registering with the opening upon revolution of the seed plate, a reversible seed box supported on the platform around the seed plate and a plurality of seed ejecting mechanisms carried by the box and adapted to be selectively locked in operative position.

2. In a device of the character described, a rotatable disk having openings adapted to be brought into register with a discharge passage, a hopper adapted to be removably and reversibly seated over said disk, and seed ejecting means carried adjacent each end of the hopper whereby to eject the seed through the openings of said disk in either of the positions of the hopper.

3. In a device of the character described, a rotatable disk having openings adapted to be brought into register with a discharge passage, a hopper adapted to be removably and reversibly seated over said disk, and seed ejecting means carried adjacent each end of the hopper whereby to eject seeds through the openings of said disk when the hopper is in either of its positions, said seed ejecting means being also adapted to eject seeds of different sizes.

4. In a planter of the character described, a seed hopper, a rotatable disk member forming a bottom for said hopper and having a plurality of circumferentially arranged openings adapted to be brought into register with a seed delivery passage, a sleeve rotatably supported upon the inner side wall of said hopper and having an opening adjacent its outer end, a coil spring positioned within said sleeve and having its one end secured while its other end is extended through said opening in the sleeve and downwardly and the last named end terminating in a lateral projection adapted to be in register with the openings of said disk member in the bottom of said hopper, and means whereby said sleeve may be clamped in adjusted position upon the side wall of the hopper and thereby to hold the spring finger in proper relation with the openings in said disk.

5. In a planter of the character described, a seed hopper, a rotatable disk member forming a bottom for said hopper and having a plurality of circumferentially arranged openings adapted to be brought into register with a seed delivery passage, a sleeve rotatably supported upon the inner side wall of said hopper and having an opening adjacent its outer end, a coil spring positioned within said sleeve and having its one end secured while its other end is extended through said opening in the sleeve and downwardly and the last named end terminating in a lateral projection adapted to be brought in register with the openings of said disk member in the bottom of said hopper, a lever extending from the sleeve whereby the same may be rotated for adjusting the position of the extended portion of said spring, and means whereby the sleeve may be locked in its adjusted position.

GEORGE H. WRIGHT.